Jan. 13, 1931.                J. D. MORGAN                 1,789,016
                        WINDSHIELD PROTECTION MEANS
                          Filed Jan. 12, 1929         3 Sheets-Sheet 1
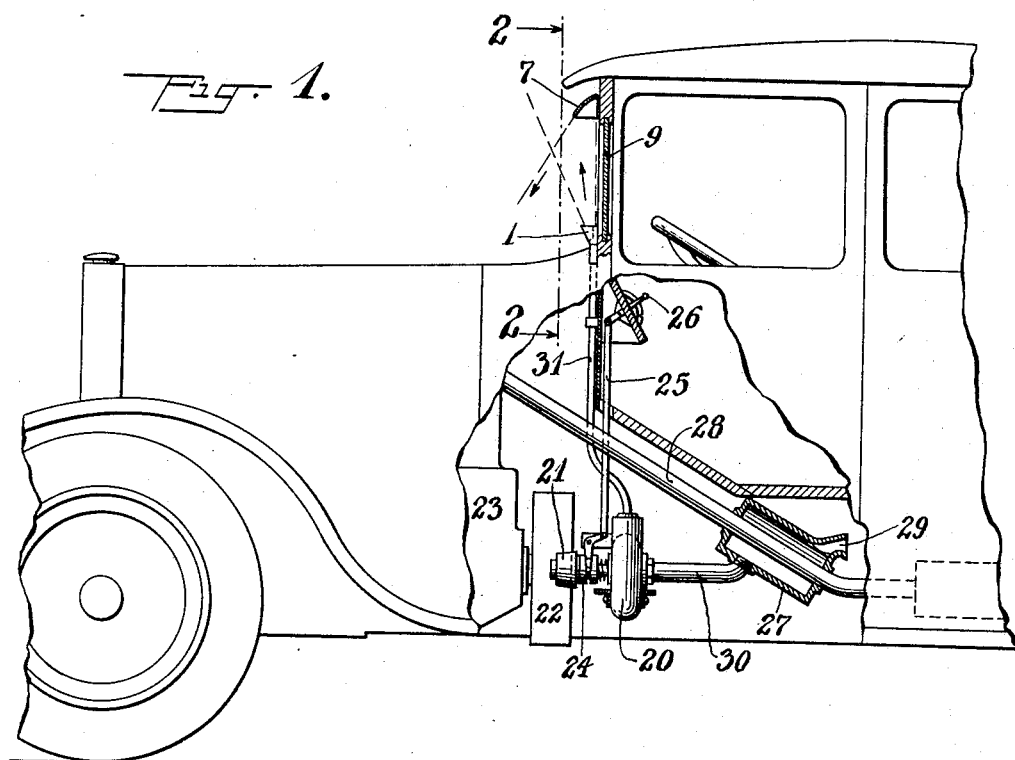
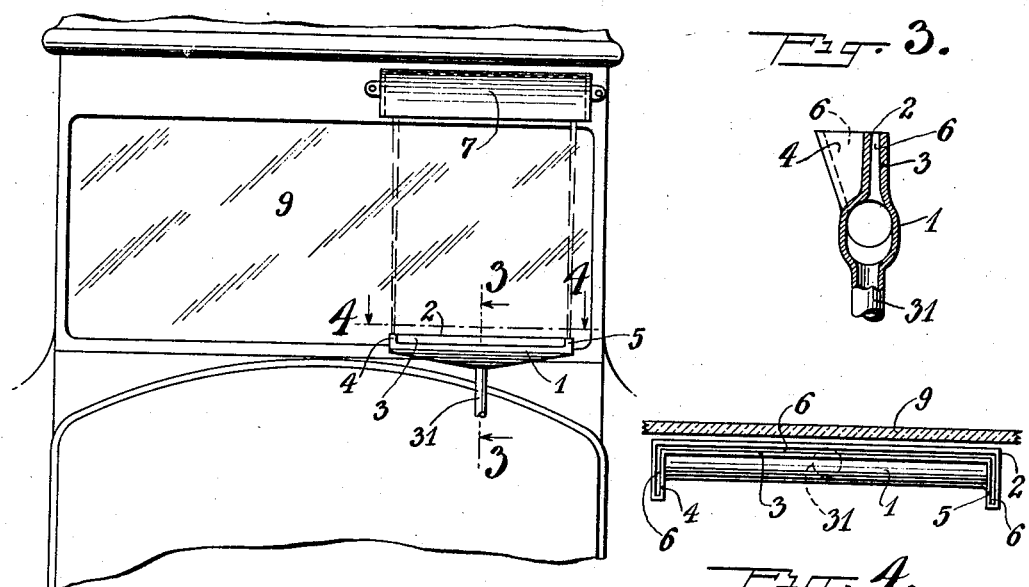
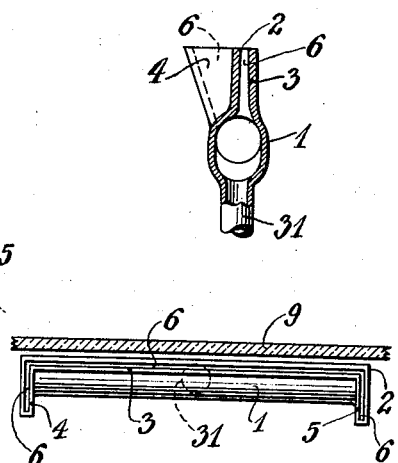
INVENTOR.
John D Morgan Jan. 13, 1931. J. D. MORGAN 1,789,016
WINDSHIELD PROTECTION MEANS
Filed Jan. 12, 1929 3 Sheets-Sheet 2
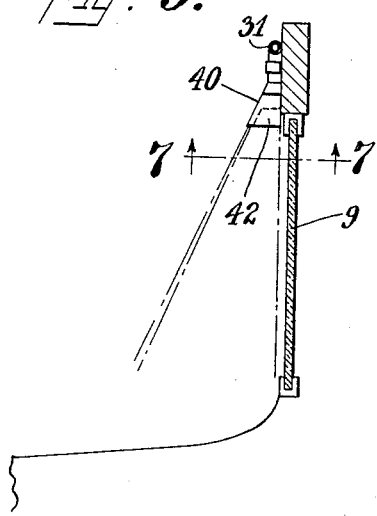
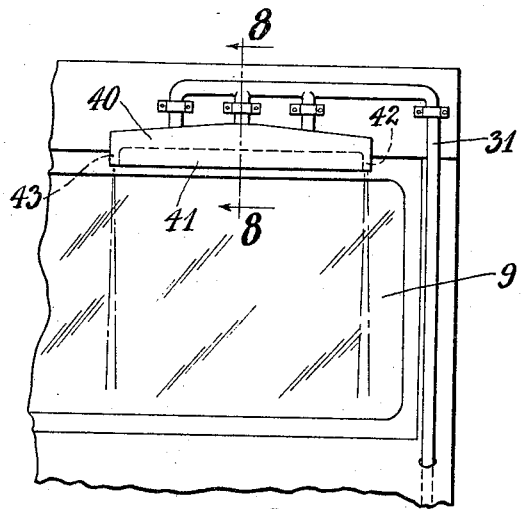
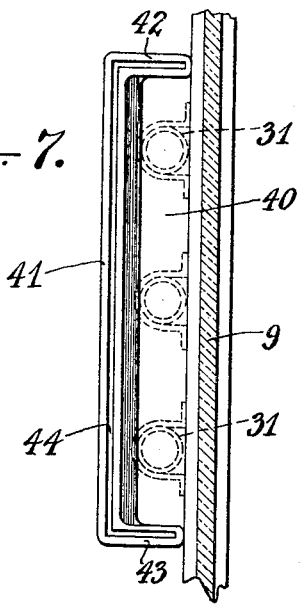
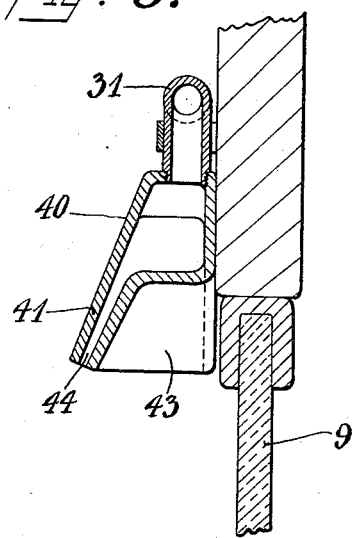
INVENTOR.
John D Morgan Jan. 13, 1931. J. D. MORGAN 1,789,016
WINDSHIELD PROTECTION MEANS
Filed Jan. 12, 1929 3 Sheets-Sheet 3
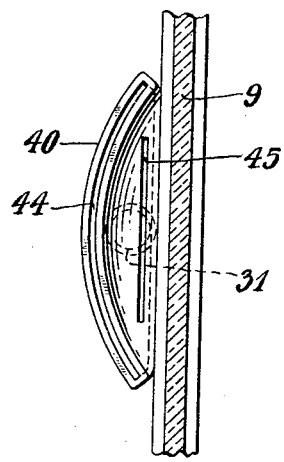
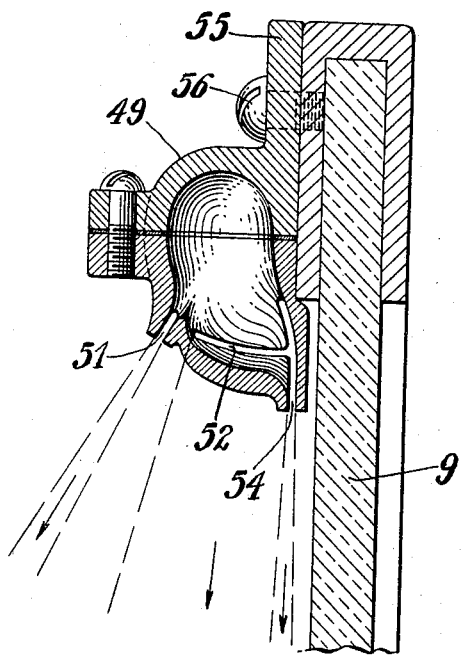
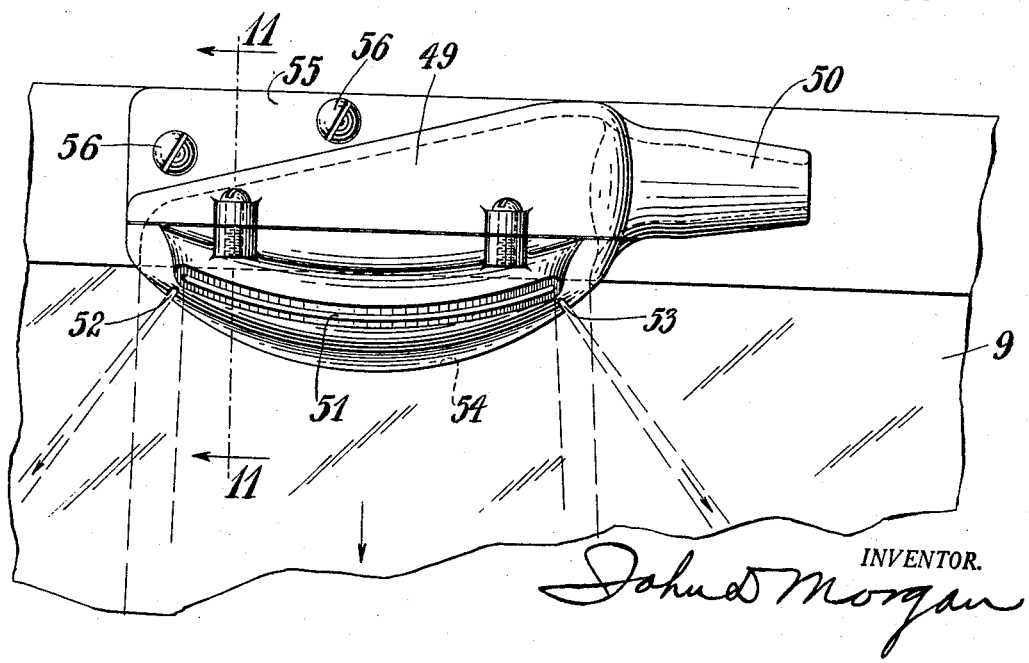
INVENTOR.
John D. Morgan

Patented Jan. 13, 1931

1,789,016

UNITED STATES PATENT OFFICE

JOHN D. MORGAN, OF SUMMIT, NEW JERSEY

WINDSHIELD-PROTECTION MEANS

Application filed January 12, 1929. Serial No. 332,027.

The invention relates to motor car windshield protectors and more especially to novel and useful improvements in devices for protecting motor car windshields from the weather by means of air currents.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a fragmentary side elevation of a motor car showing one form of the invention applied thereto;

Fig. 2 is a front elevation and partial section on lines 2—2 of Fig. 1;

Fig. 3 is a fragmentary view taken on line 3—3 of Fig. 2;

Fig. 4 is a fragmentary view taken on line 4—4 of Fig. 2;

Fig. 5 is a fragmentary elevation of a motor car showing a different form of the invention;

Fig. 6 is a fragmentary front elevation corresponding to Fig. 5;

Fig. 7 is a view taken on line 7—7 of Fig. 5;

Fig. 8 is an enlarged section on line 8—8 of Fig. 6;

Fig. 9 is a detail of an arcuate form of the air current projector;

Fig. 10 is a detail elevation of another form of the invention: and

Fig. 11 is a section on line 11—11 of Fig. 10.

The invention provides, for the purpose of protecting motor car windshields from the weather, a moving sheet of air which is so shaped, and so located with respect to the windshield, as to serve as a transparent, moving closure for the portion of the windshield used by the driver (or for the entire windshield if that should be desired). In addition to acting as a weather-proof closure of a part of the windshield, the shaped and moving current of air at the same time also acts by reason of its movement, to mechanically deflect and drive away rain, snow or hail, these two actions or functions of the moving air current cooperating to keep the windshield clear of rain, snow, or frost. In accordance with one feature of the invention, there is optionally provided in cooperating with the air current closure described, means for directing a current or sheet of warm air along or very close to the windshield, as a further weather protection, although usually this additional means will not be needed. In the preferred form of my invention the air currents are employed in relatively thin sheets moving at relatively great velocity.

The invention operates primarily to prevent the deposition of rain or snow on the windshield, irrespective of the direction from which a storm may be driving, as distinguished from the usual scraping off from the windshield of deposited rain, frost, or snow. However, if the current of warm air moving along the windshield be utilized, it will operate to remove any previously deposited snow or frost, as well as to prevent any further deposition thereof. It is obviously more efficient to prevent the deposition of the elements upon the windshield than it is to scrape them from the windshield, and the present invention also obviates the detrimental and annoying effects of a mechanical device continuously moving across the field of vision of the driver.

By my invention, a multi-sided or curved sheet of swiftly moving air is directed as a transparent closure for the windshield against storms driving from different directions, and also as a means for bodily deflecting and driving off rain or snow; and optionally also the air stream is deflected transversely to its original path to constitute a further or double protection from the weather.

Referring now in detail to the embodiment of the invention illustrated by way of example in the accompanying drawings, in Figs. 1 to 4 an embodiment is shown wherein a current of heated air is directed upwardly along the windshield, and then is directed outwardly therefrom in a form to both shut out and drive away snow and rain, irrespective of the direction from which the storm may be driving. In these figures of the drawings, the air current is shown driven upwardly from the bottom of, and along the windshield, and at its side, or sides, the air current is approximately perpendicular to the windshield, or in curved or other equivalent form, for the purposes described. As embodied, the air current is deflected downwardly and outwardly in a sheet or current from the top of the windshield. In this form, the moving air current is approximately three-sided as it moves upwardly along the windshield, the central portion moving along and approximately parallelly to the windshield, and the side portions of the unitary air current moving upwardly approximately perpendicularly to the windshield. By the use of a top deflector, the air current is turned to form a top outwardly and downwardly directed current or sheet, in front of that previously described. The deflector may be formed to also return two relatively steeply downwardly-directed sides of parts of the air current extending from the windshield outwardly to the downwardly deflected top air current, and also cooperating with the upwardly directed side currents, but this will not usually be required for complete weather protection. The total air current, in either form, constitutes a swiftly outwardly-moving closure or shield of air, preventing the entry of the elements either from in front, or above, or either side, onto the entire windshield or onto the portion thereof used by the driver.

In this embodied form, as exemplified in Figs. 1 to 4, an air current forming and directing device is located near the bottom of the windshield 9, having the functions described, and as shown it comprises a body 1, which is supplied with a current of air, preferably heated, from a suitable source, as by a pipe 31. The body 1 is provided with an air current forming and discharging member 2, having a central straight reach or portion 3, and side portions 4 and 5, extending from the front central portion 3. This discharge member is provided with an air current discharging slot, or series of openings 6, which are similarly shaped or arranged, so as to provide the multi-sided or curved continuous sheet or current already described, the central part moving approximately along the windshield and the unitary side portions extending outwardly therefrom to constitute a transparent, moving weather shield. To provide the continuous outwardly and downwardly directed portion of the air current, a top deflector member 7 is provided, shaped to receive the air current at or near the top of the windshield and to direct it downwardly and outwardly in the manner described.

So far as concerns the main features of the invention, any known or other suitable means for supplying the air, preferably heated, may be utilized. As exemplified a rotary blower 20 is mounted to be driven from the engine, and as shown, a friction drive wheel 21 is driven from the fly wheel 22 of the engine 23. Suitable means are provided for connecting and disconnecting the blower and the fly wheel, and as shown a clutch 24 is mounted on the blower shaft, and is connected by a link 25 to a suitable hand-lever 26, on the dash-board or at any other suitable place within the car. To provide heated air, a cylinder 27 encircles a portion of the engine exhaust pipe 28, which heating cylinder has an air intake 29, and has also an air supply pipe 30 connecting to the blower. A connecting pipe 31 conveys the air from the blower to the windshield protecting device. It will be understood, however, that the means for providing the air currents may be widely varied as may be found suitable or convenient. For instance, the air may be supplied by the engine fan and may be heated by the engine.

In Figs. 5 to 8 of the present exemplary embodiment a simpler arrangement of multi-sided air current mechanism is shown. Therein, the enclosing air current is directed primarily downwardly and outwardly from the top of the windshield, and downwardly, outwardly, and more steeply at either side, unitarily and continuously with the top or front sheet or part of the air current, to shut out from the windshield rain or snow driving in from the front, or above, or either side. In this embodied form, the air current forming means is located at or near the top of the windshield, and is provided with a body 40, arranged along the top of the windshield, and with an air current forming and directing part 41 integral therewith which is inclined downwardly and outwardly, and which is formed at either end into angular or curved portions 42 and 43 extending backwardly therefrom toward the windshield.

The discharge edge of the device is provided with an air current emitting slot, or series of apertures 44, the entire device being formed and adapted to emit a forwardly and downwardly-directed, multi-sided or curved, swiftly-moving sheet or current of air, which at its side edges practically joins with and moves along the surface of the windshield 9, and thus provides a transparent, moving, gaseous closure protecting the windshield from the deposition of rain or snow or other elements and, as explained, by reason of its movement, serving also to mechanically deflect and drive away snow or rain. The particular form of the device, may, of course, be modified as found suitable or convenient, as for instance, it could be made to more nearly approximate an arcuate form, if desired, as is shown in Fig. 9. A slot 45 could be arranged in the body 40, in either form, to project a sheet of air downwardly along the face of the windshield if desired.

In Figs. 10 and 11 is shown an embodiment of the invention adapted to provide a downwardly and outwardly directed air current or sheet of high velocity, with two integral parts, or two cooperating currents or sheets at the sides, to form a continuous and swiftly outwardly moving closure against, and deflector of, snow, rain or sleet, in the manner previously described. The body 49 of the device has an air current receiving connection 50 at one end and the inner cavity is tapered to maintain substantially uniform air pressure throughout. The slot 51 for the main outwardly directed air current or sheet in this form is preferably curved to give a somewhat spreading or fan like form to the current. The side slots 52 and 53 may be continuous or separate as a matter of structural convenience.

In this form is shown also a slot 54 for directing a sheet of air downwardly along the face of the windshield, which may be an optional feature, although it will be usually found desirable. The device may be easily and cheaply made as a two-part casting, and the inner end, where the body is smaller may be formed into a base or flange 55, whereby the device may be fastened by screws 56 either to the windshield frame or to the body of the car.

The invention in its broader aspects is not limited to the specific mechanisms shown and described but departures may be made therefrom within the scope of the accompanying claims without departing from the principles of the invention and without sacrificing its chief advantages.

What I claim is:—

1. A weather protection device for a motor car windshield including means for directing a sheet of air along and substantially in contact with the windshield and means for directing another enclosing current or sheet of air extending from the windshield outwardly and back again to the windshield in front of said first mentioned sheet, to prevent the deposition of rain or snow on the windshield.

2. A weather protection device for a motor car windshield including means for heating air and directing a sheet of hot air along and substantially in contact with the windshield and means for directing another moving, multisided current or sheet of air extending from the windshield outwardly and back again to the windshield in front of said first mentioned sheet as a protection from the weather whether coming from the front or the side.

3. A weather protection device for a movable motor car windshield including in combination means for mounting the device on the windshield frame, means for directing a sheet like current of air from the device with its edges along the windshield and medianly curving outwardly therefrom, said device moving with the windshield, and means for supplying a current of air to the device.

4. A weather protection device for a movable motor car windshield including in combination means for mounting the device on the windshield frame, means for directing a sheet like current of air from the device along and substantially in contact with the windshield and a similar current of air with its edges along the windshield and medianly curving outwardly therefrom, said device moving with the windshield, and means for supplying a current of air to the device.

5. A weather protection device for a movable motor car windshield including in combination a hollow device having means for attaching it to the windshield frame, and an internal air chamber, an air supply pipe connection, an emission slot adapted to direct a sheet like current of air along and in contact with the windshield, and an emission slot adapted to direct a sheet like current of air with its edge moving along the windshield and its intermediate portion spaced away from the windshield.

6. A weather protection device for a movable motor car windshield including in combination a hollow device having an internal air chamber, an air supply pipe connection, an emission slot adapted to direct a sheet like current of air along and in contact with the windshield, and an emission slot adapted to direct a sheet like current of air with its edge moving along the windshield and its intermediate portion spaced away from the windshield.

7. As an attachment for a motor car a hollow body having an internal chamber, means for admitting air into said chamber, the wall of said chamber being slotted to emit a thin, high velocity sheet of air to form a transparent moving weather screen without and spaced away from the windshield.

8. As an attachment for a motor car a hollow body having an internal chamber, means for admitting air into said chamber, the wall of said chamber having a multidirectional slot to emit a thin, high velocity enclosing sheet of air to form a bent, transparent moving weather screen without and spaced away from the windshield.

9. As an attachment for a motor car a hollow body having an internal chamber, means for admitting air into said chamber, the wall of said chamber having a multidirectional slot shaped to emit a thin, high-velocity enclosing sheet of air of gradually increasing cross section, to form a bent, enclosing transparent weather screen without the windshield.

10. As an attachment for a motor car a hollow body having an internal chamber, means for admitting air into said chamber, the wall of said chamber having a multidirectional slot shaped to emit a thin, high-velocity enclosing sheet of air of gradually increasing cross section, to form a bent, enclosing transparent weather screen without the windshield and with its edges moving substantially along the windshield.

11. As an attachment for a motor car, a weather protector for the windshield having a hollow air containing body of a length of only a fraction of that of the windshield, means for admitting air under pressure thereto, and means for emitting therefrom a thin bent sheet of air of gradually increasing cross-section to form a transparent moving weather screen without the windshield.

12. As an attachment for a motor car, a weather protector for the windshield having a hollow air containing body of a length of only a fraction of that of the windshield, means for admitting air under pressure thereto, and means for emitting therefrom a thin bent sheet of air of gradually increasing cross-section, with its side edges traveling substantially along the windshield, to form a transparent moving weather screen without the windshield.

In testimony whereof, I have signed my name to this specification.

JOHN D. MORGAN.